(12) United States Patent
Russell et al.

(10) Patent No.: US 7,452,833 B2
(45) Date of Patent: Nov. 18, 2008

(54) HEAT-REFLECTIVE NONWOVEN LINER MATERIAL

(75) Inventors: Robert Daniel Russell, Mansfield, TX (US); Chris Haas, North Bay (CA)

(73) Assignee: Polymer Group, Inc., Charlotte, NC (US)

( * ) Notice: Subject to any disclaimer, the term of this patent is extended or adjusted under 35 U.S.C. 154(b) by 0 days.

(21) Appl. No.: 11/215,782

(22) Filed: Aug. 30, 2005

(65) Prior Publication Data

US 2006/0135019 A1   Jun. 22, 2006

Related U.S. Application Data

(60) Provisional application No. 60/605,624, filed on Aug. 30, 2004.

(51) Int. Cl.
   B32B 15/14 (2006.01)
   B32B 3/10 (2006.01)
   B32B 27/12 (2006.01)
   D04H 3/16 (2006.01)

(52) U.S. Cl. ........................ 442/378; 442/376; 442/379; 442/394; 442/398; 442/401; 428/131; 428/137

(58) Field of Classification Search ................. 442/340, 442/361, 376, 378, 379, 394, 398, 401
   See application file for complete search history.

(56) References Cited

U.S. PATENT DOCUMENTS

| | | | |
|---|---|---|---|
| 4,041,203 A | 8/1977 | Brock et al. | |
| 4,622,253 A | 11/1986 | Levy | |
| 5,057,368 A | 10/1991 | Largman et al. | |
| 5,098,764 A | 3/1992 | Bassett et al. | |
| 5,244,711 A | 9/1993 | Drelich et al. | |
| 5,322,736 A | 6/1994 | Boyle et al. | |
| RE35,427 E | 1/1997 | Poettgen | |
| 5,679,379 A | 10/1997 | Fabbricante et al. | |
| 5,750,242 A * | 5/1998 | Culler | 428/209 |
| 5,822,833 A | 10/1998 | James et al. | |
| 5,827,597 A | 10/1998 | James et al. | |
| 5,834,119 A | 11/1998 | Roop | |
| 5,955,175 A | 9/1999 | Culler | |
| 6,114,017 A | 9/2000 | Fabbricante et al. | |
| 6,191,221 B1 | 2/2001 | McAmish et al. | |
| 6,355,733 B1 | 3/2002 | Williams et al. | |
| 6,770,234 B2 | 8/2004 | Osborn et al. | |
| 2004/0152387 A1 | 8/2004 | Rudisill et al. | |
| 2006/0000005 A1 * | 1/2006 | Foreman et al. | 2/115 |

* cited by examiner

Primary Examiner—Jenna-Leigh Johnson
(74) Attorney, Agent, or Firm—Kilyk & Bowersox, PLLC; Valerie Calloway

(57) ABSTRACT

A heat reflective garment interlining laminate is provided that includes a continuous filament layer and a metallized thermoplastic film. The laminate is characteristically low-cost and suitable for such apparel applications as sports clothing, military clothing, camping gear, hunting/fishing clothing, and the like.

15 Claims, 2 Drawing Sheets

HEAT-REFLECTIVE NONWOVEN LINER MATERIAL

CROSS-REFERENCE TO RELATED APPLICATION

This application claims the benefit of priority Provisional Application No. 60/605,624, filed Aug. 30, 2004, the disclosure of which is incorporated herein by reference.

TECHNICAL FIELD

The present invention generally relates to a heat reflective laminate, and more specifically relates to a metallized heat reflective nonwoven laminate that includes a continuous filament fabric and a film.

BACKGROUND OF THE INVENTION

Garment interlinings are known in the art and typically comprise two or more substrates that impart an insulating performance to a garment. Woven substrates are often utilized for this purpose; however, the production of conventional textile fabrics is known to be a complex, multi-step process that can be cost inhibiting. Comparatively, nonwoven fabrics are known to be more cost efficient than traditional textile processes as the fabrics are produced directly from the carding process. Nonwoven fabrics are suitable for use in a wide variety of applications where the efficiency with which the fabrics can be manufactured provides a significant economic advantage for these fabrics versus traditional textiles. Such applications include, but are not limited to, sport clothing, military clothing, camping gear, hunting and fishing clothing and the like.

Nonwoven fabrics are commonly used as garment interlinings since they can provide uniform coverage and needed insulation to a garment. Garments worn in colder climates often utilize an interlining to retain heat emitted by the body. In an effort to improve the insulative performance of interlining fabrics, metal foils have been integrated therewith due to the inherent heat reflective property. As taught in U.S. Pat. No. 4,622,253, entitled, "Thermal Laminated Lining and Method of Manufacture", issued on Nov. 11, 1986, in the name of inventor Levy, aluminum foil can be used in combination with one or more substrates. Although foil is favored because of its pliability, foil is noisy, difficult to sew, and lacks the drapeability desired in apparel applications.

A need remains for a cost efficient interlining material that is heat reflective, quiet, drapeable, and easy to sew. The desired interlining material will, thus, be suitable for apparel applications, including military attire, sporting and outdoor goods, industrial applications and the like.

SUMMARY OF THE INVENTION

The present invention is directed to a cost efficient metallized heat reflective nonwoven laminate comprised of a continuous filament fabric and a metallized thermoplastic film. The laminate of the present invention is especially suited for use as liner material in apparel applications, such as sports clothing, military clothing, camping gear, hunting/fishing clothing, and the like. The laminate is comprised of a smooth film layer and a nonwoven fabric layer, wherein the film surface of the laminate is metallized to impart a reflectivity performance to the laminate. The metallized surface acts to improve the retention of body heat within a garment.

The fabric layer is comprised of a continuous filament fabric, or spunbond fabric. In one embodiment, the continuous filament fabric may include those fabrics formed from filaments having a nano-denier. Further still, the continuous filament fabric may be formed from an intermingling of conventional and nano-denier filaments.

In accordance with an embodiment of the present invention, a heat-reflective, garment interlining laminate is defined. The laminate includes a continuous filament nonwoven layer and a metallized thermoplastic film layer affixed to the continuous filament nonwoven layer that exhibits a reflectivity of at least about 0.85.

The continuous filament nonwoven layer may be formed from filaments such as polyolefins, polyamides, polyesters, a combination thereof and the like. In certain embodiments, the continuous filament nonwoven layer may include nano-denier filaments, filaments of varying geometric cross-section, splittable filaments, multi-component filaments, such as side-by-side filaments, sheath-core filaments, and islands-in-the-sea filaments. Additionally, the continuous filament nonwoven layer may also include an internal or topically applied performance modifying additive.

The metallized thermoplastic film layer will typically formed of a thermoplastic, such as a polyolefin, a polyamide, a polyester, derivatives thereof, and combinations thereof. Additionally, the metallized thermoplastic film layer may include an internal or topically applied performance modifying additive.

It has been contemplated that the metallized garment interlining laminate of the present invention may be imparted with one or more surface projections creating a bi-planar fabric. Further, the laminate may be entirely or partially apertured so as to impart a breathable performance into the laminate material. Further still, the laminate may comprise a combination of both surface projections and apertures. The incorporation of one or more surface projections in addition to apertures may be of benefit to a garment interlining in order to better facilitate the flow of air through the garment.

The invention is also embodied in a method for manufacturing a heat-reflective, garment interlining laminate. The method includes the steps of forming a continuous filament layer, metallizing a thermoplastic film layer; and affixing the metallized thermoplastic film layer to the continuous filament layer. In such a method the continuous filament layer may be formed by a spunbond process. The metallizing of the thermoplastic film layer may include any known metallization process, such as evaporative metallization, metal bath, metal sputtering, electron beam metal vapor deposition and a combination thereof. Affixing the metallized thermoplastic layer to the continuous filament nonwoven layer may involving a lamination process, a chemical bonding process or any other suitable means of affixing may be used.

A further method for manufacturing a heat-reflective, garment interlining laminate is also embodied in the invention. The method includes the steps of forming a continuous filament layer, affixing a thermoplastic layer film layer to the continuous filament layer and metallizing the thermoplastic film layer of the affixed film layer and continuous filament nonwoven layer such that at least 0.85 reflectivity is exhibited. The step of continuous filament layer will typically be formed by a spunbond process. The metallizing of the thermoplastic film layer may include any known metallization process, such as evaporative metallization, metal bath, metal sputtering, electron beam metal vapor deposition and a combination thereof. Affixing the thermoplastic layer to the continuous filament nonwoven layer may involving a lamination process, a chemical bonding process or any other suitable means of affixing may be used. Subsequent to the formation of the laminate, a layer of metal is applied to the film layer of the laminate by evaporative metallizing. This process deposits a uniform metal coating on the film surface by evaporating metal wire onto a heated crucible in a low pressure vacuum chamber. Optionally, other chemical or mechanical metallization processes may be utilized, including, but not limited to metal baths, metal sputtering, electron beam metal vapor deposition and the like.

Optionally, a variety of additional substrates may be mechanically or chemically bonded to the metallized laminate of the present invention, such as additional spunbond or meltblown webs, carded webs, such as through air bond or thermal bond webs, scrims, such as meshes, nets, films, such as monolithic film, and a combination thereof. Performance and/or aesthetic enhancing additives may also be incorporated into or topically applied to one or more layers of the metallized laminate. Other features and advantages of the present invention will become readily apparent from the following detailed description, the accompanying drawings, and the appended claims.

Thus, the present invention results in reflective non-woven fabric that is cost efficient, quiet, drapeable, and easy to sew. The fabric is thus will suited for garment interlining material such as military attire, sporting and outdoor goods, industrial applications and the like.

BRIEF DESCRIPTION OF THE DRAWINGS

Figure 1:
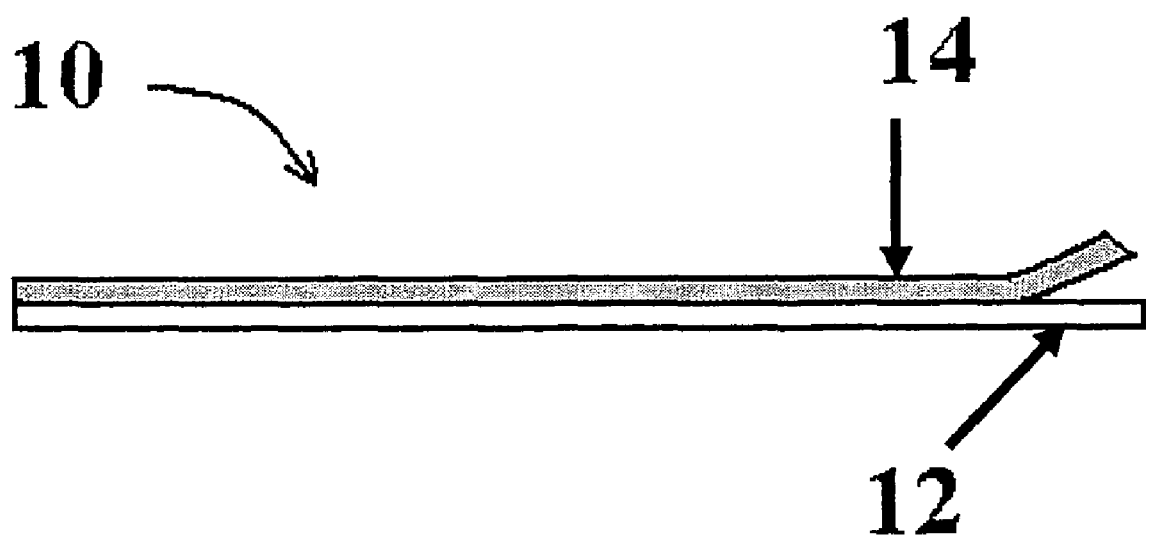
Figure 2:
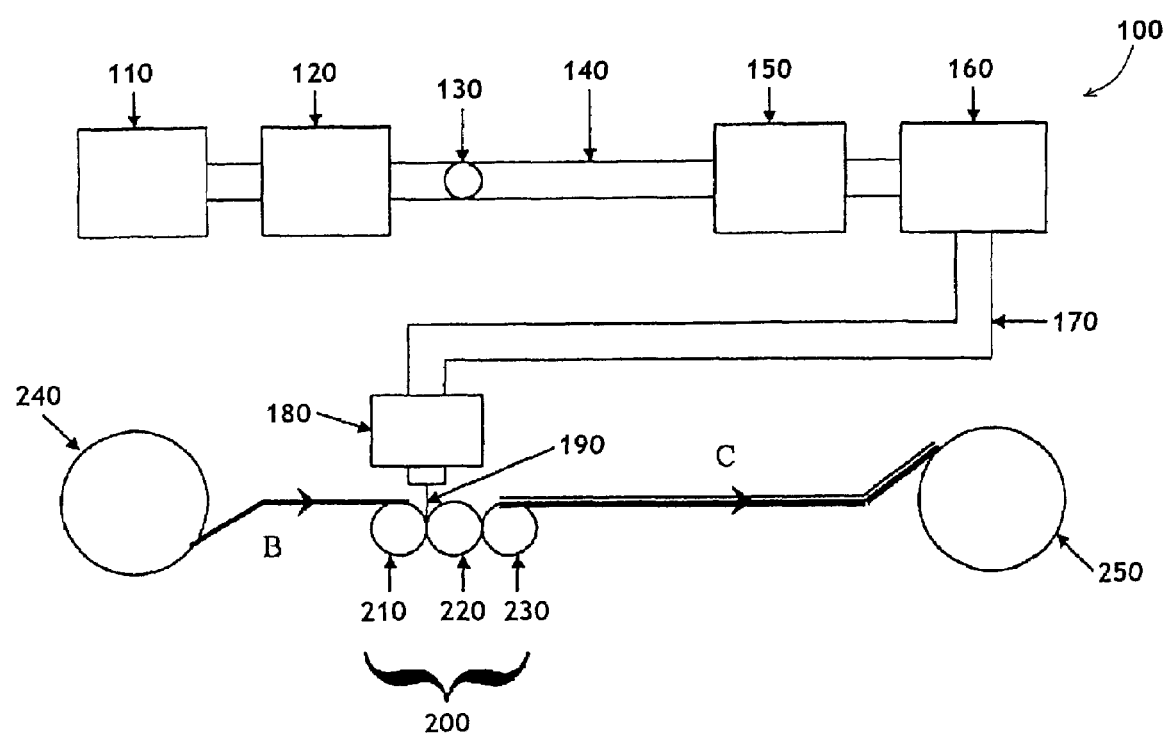

Having thus described the invention in general terms, reference will now be made to the accompanying drawings, which are not necessarily drawn to scale, and wherein:

FIG. 1 is a perspective view of a heat-reflective, garment interlining laminate, in accordance with an embodiment of the present invention; and FIG. 2 is a schematic view of a method for making the heat-reflective, garment interlining laminate, in accordance with an embodiment of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with an embodiment of the present invention and as illustrated in FIG. 1, a metallized garment interlining fabric 10 includes a continuous filament nonwoven layer 12 and a metallized thermoplastic film layer 14 that will characteristically exhibit a reflectivity of at least about 0.85.

The continuous filament nonwoven layer will typically be formed of a thermoplastic polymer. Typical thermoplastic polymers that may be used to form the filament layer include, but are not limited to polyolefins, polyamides, and polyesters. The exemplary polyolefins may include polypropylene, polyethylene, combinations thereof and the like.

Further, the continuous filament nonwoven layer may include those fabrics formed from filaments having a nano-denier, as taught in U.S. Pat. No. 6,114,017, entitled, "Micro-denier Nonwoven Materials Made Using Modular Die Units", issued on Sep. 5, 2000, in the name of inventors Fabbricante, et al. This patent is herein incorporated by reference as if setforth fully herein. Further still, the continuous filament fabric may be formed from a combination of conventional filaments and nano-denier filaments.

Additionally, the continuous filaments used in the present invention may vary in geometric cross-section. Such continuous filaments are disclosed in U.S. Pat. No. 5,057,368, entitled "Filaments Having Trilobal or Quadrilobal Cross-sections", issued Oct. 15, 1991, in the name of inventor to Largman, et al.; U.S. Pat. No. 5,322,736, entitled, "Hollow-trilobal Cross-section Filaments", issued Jun. 21, 1994, in the name of inventors Boyle, et al.; and U.S. Pat. No. 5,834,119, entitled, "Filament Cross-Sections", issued on Nov. 10, 1998, in the name of inventor to Roop. These patents are herein incorporated by reference as if setforth fully herein Multi-component filaments may also be utilized as well, such as side-by-side filaments, sheath-core filaments, and islands in the sea filaments. Splittable fibers are also suitable for use in the present invention, wherein upon impact the components of such fibers separate. The aforementioned filaments may be used in whole or in part within one or more layers of the metallized interlining laminate.

Additionally, the continuous filament nonwoven layer may include a performance modifying additive, such as thermal stabilizers, softening agents, antimicrobial agents, fire-retarding agents, cross-linking agents, slip additives, and wetting agents, UV, anti-stats, colorants, and nucleating agents. A nucleating agent may be specifically compounded to produce a more stable spinning process, and, at equal process conditions, can produce a further increase in strength. The fabric may be exposed to further performance enhancing additives after fabric formation. The additives may be internal to the filaments or the additives may be applied topically to the filaments either prior to or after formation of the filament layer.

The continuous filament nonwoven layer may include one or more surface projections and/or apertures. The surface projections create a bi-planar fabric. Further, the laminate may be entirely or partially apertured so as to impart a breathable performance into the laminate material. Additionally, the laminate may comprise a combination of both surface projections and apertures. The incorporation of one or more surface projections in addition to apertures may be of benefit to a garment interlining in order to better facilitate the flow of air through the garment.

The metallized thermoplastic film layer of the present invention may be formed from any suitable thermoplastic. Examples of suitable thermoplastics include, but are not limited to, polyolefins, polyamides, polyesters, derivatives thereof, and combinations thereof. Further, the metallized film may include any metal which is suitable for physical vapor deposition or metal sputtering processes may be used to form metallic coatings on the elastic film. Exemplary metals include aluminum, copper, tin, zinc, lead, nickel, iron, gold, silver and the like. Exemplary metallic alloys include copper-based alloys (e.g., bronze, monel, cupro-nickel and aluminum-bronze); aluminum based alloys (aluminum-silicon, aluminum-iron, and their ternary relatives); titanium based alloys; and iron based alloys. Useful metallic alloys include magnetic materials (e.g., nickel-iron and aluminum-nickel-iron) and corrosion and/or abrasion resistant alloys.

Additionally, the metallized thermoplastic film layer may include a performance modifying additive, such additives include, without limitation, pigments, surfactants, waxes, flow promoters, particulates, and materials added to enhance processing ability of the composition. The additives may be internal to the filaments or the additives may be applied topically to the filaments either prior to or after formation of the filament layer.

The metallized thermoplastic film layer will exhibit a reflectivity of at least 0.85. The required reflectivity is necessary to allow the laminate to perform as a heat retaining fabric in clothing applications. Such reflectivity is particularly advantageous in clothing applications, such as military attire, sporting/outdoors clothing and industrial clothing.

In some embodiments, the continuous filament nonwoven layer may be advanced onto a forming apparatus so as to impart one or more surface projections, wherein such forming apparatus include three-dimensionally surfaced belt, metal drums, wire screens, and three-dimensional image transfer devices. Teachings of suitable forming apparatus are disclosed in commonly assigned U.S. Pat. Nos. 4,098,764, 5,244,711, 5,822,823, and 5,827,597, which are hereby incorporated by reference. Further, the continuous filament nonwoven layer may include one or more apertures or a combination of both surface projections and apertures.

The present invention is also embodied in a method for manufacturing the heat-reflective, garment interlining laminate of the present invention. The process includes the steps of forming a continuous filament layer; metallizing a thermoplastic film layer; and affixing the metallized thermoplastic layer to the continuous filament layer.

Typically, the formation of continuous filament webs involves the process of "spunbond". A spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one spinneret is used in line for the purpose of forming a multi-layered fabric, the subsequent webs are collected upon the uppermost surface of the previously formed web. Spunbond processing is taught in detail in U.S. Pat. No. 4,041,203 to Brock et al. As previously mentioned, the continuous filament fabric may include those fabrics formed from filaments having a nano-denier, spunbond processing of nano-denier filaments is disclosed in previously incorporated U.S. Pat. Nos. 5,678,379 and 6,114,017.

The thermoplastic film layer may be formed from any conventional film formation process, such as, by way of example, described in U.S. Pat. No. 6,770,234, entitled, "High temperature polyester film extrusion", issued on Aug. 3, 2004, in the name of inventors Osborn, et al.; U.S. Pat. No. 6,355,733, entitled, "Polyethylene blends and films", issued on Mar. 12, 2002, in the name of inventors Williams, et al.; and U.S. Pat. No. 6,191,221, entitled, "Breathable film compositions and articles and method", issued on Feb. 20, 2001, in the name of inventors McAmish, et al., all of which are incorporated herein by reference. The metallization of the thermoplastic film layer may involve any suitable metallization process, such as evaporative metallization, metal bath, metal sputtering, electron beam metal vapor deposition and a combination thereof.

The continuous filament nonwoven layer of the present invention is typically affixed to the metallized thermoplastic film layer by a conventional lamination process. FIG. 2 depicts one representative direct extrusion film process and lamination 100. The formation of the thermoplastic film is initiated at a blending and dosing system 110 that includes at least two hopper loaders; one for polymer chip and one for additive pellet. Variable speed augers within both hopper loaders transfer predetermined amounts of polymer chip and additive pellet to a mixing hopper within the blending and dosing system 110. The mixing hopper includes a mixing propeller to further the homogeneity of the mixture.

The polymer chip feeds into a multi-zone extruder 120, such as the extruder supplied by the Welex Corporation of Blue Bell, Pa. In this particular system, a five zone extruder was employed with a two inch water-jacketed bore and a length to diameter ratio of 24 to 1.

Upon mixing and extrusion from multi-zone extruder 120, the polymer compound is conveyed via heated polymer piping 140 through screen changer 130. Typically, breaker plates having different screen meshes are employed in the heated polymer piping to retain solid or semi-molten polymer chips and other macroscopic debris. The mixed polymer is then fed into melt pump 150.

Melt pump 150 operates in dynamic feed back with the multi-zone extruder 120 to maintain the desired pressure levels. In one specific example, a gear-type melt pump is employed to respond to pressure levels by altering the speed of the extruder to compensate for deviations from the pressure set point window.

The metered and mixed polymer compound then enters combining block 160. The combining block allows for multiple film layers to be extruded, the film layers being of either the same composition or fed from different systems as described above. The combining block 160 is directed into die body 180 by additional heated polymer piping 170.

The particular die body 180 employed in this exemplary system is a 37 inch wide EDI Automatic Die with die bolt control as supplied by Extrusion Dies Industries (EDI), of Chippewa Falls, Wis. The die body 180 is positioned in an overhead orientation such that molten film extrusion 190 is deposited at the nip point in cast station 200, between nip roll 210 and cast roll 220.

The continuous filament nonwoven layer annotated as B is provided in roll form to a tension-controlled unwinder 240. The continuous filament nonwoven layer is unwound from unwinder 240 and moves over nip roll 210, the nip roll having an ambient temperature. The molten film extrusion 190 from die body 180 is deposited onto layer B at the nip point between nip roll 210 and cast roll 220, the cast roll having a chilled matte finished chrome facing. The newly formed laminate, annotated as C, is removed from cast roll 220 by stripper roll 230, the stripper roll having a chilled polished chrome facing. The laminate material C is then wound onto a new roll at variable-speed winder 250.

Subsequent to the formation of the laminate, a layer of metal is applied to the film layer of the laminate by evaporative metallizing. This process deposits a uniform metal coating on the film surface by evaporating metal wire onto a heated crucible in a low pressure vacuum chamber. Optionally, other chemical or mechanical metallization processes may be utilized, including, but not limited to metal baths, metal sputtering, electron beam metal vapor deposition and the like.

In accordance with the present invention, the metallized laminate may also be formed in an in-line process. Subsequent to the formation of the laminate or prior to chemically adhering the film to the continuous filament layer, the film layer is subjected to a metallization process, wherein the metal may be selected from various metal compounds and associated alloys. The metallization process is preferably an evaporative process, wherein the metal is applied to the film in a vacuum chamber. Accordingly, aluminum wire is fed onto ceramic boats and melted, then evaporates due to the low pressure in the vacuum chamber. It has also been contemplated that the metallization process may also include metal baths, metal sputtering, electron beam metal vapor deposition and the like.

As previously mentioned, the garment interlining laminate is treated with metallization such that the laminate exhibits a reflectivity of at least about 0.85 per ASTM E1933-99a, a method for measuring and compensating for emissivity using infrared imaging radiometers.

Thus, the present invention provides for a heat reflective garment interlining laminate that is low-cost and suitable for such apparel applications as sports clothing, military clothing, camping gear, hunting/fishing clothing, and the like. Further, alternate end-uses include blankets, such as insulative blankets, emergency rescue blankets, institutional blankets, or airline blankets.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A heat-reflective, garment interlining laminate article, the laminate article comprising:
    a continuous filament nonwoven layer;
    a metallized thermoplastic film layer affixed directly to the continuous filament nonwoven layer, wherein said metallized thermoplastic film layer consists of single thermoplastic film layer directly affixed as an extrusion coating to the continuous filament nonwoven layer and a metal coating layer applied to a film surface of the thermoplastic film layer affixed to the continuous filament nonwoven layer, and wherein the metallized thermoplastic film layer exhibits a reflectivity of at least about 0.85; and
    at least one aperture whereby the laminate article comprising said nonwoven layer and said metallized thermoplastic film layer is entirely apertured sufficient to facilitate flow of air through the laminate article and impart a breathable performance thereto.

2. The article of claim 1, wherein the continuous filament nonwoven layer comprises filaments selected from the group consisting of polyolefins, polyamides, polyesters, and a combination thereof 3. The article of claim 1, wherein the continuous filament nonwoven layer comprises filaments of varying geometric cross-section.

4. The article of claim 1, wherein the continuous filament nonwoven layer comprises multi-component filaments.

5. The article of claim 4, wherein the multi-component filaments are selected from the group consisting of side-by-side filaments, sheath-core filaments, and islands-in-the-sea filaments.

6. The article of claim 1, wherein the continuous filament nonwoven layer comprises splittable filaments.

7. The article of claim 1, wherein the metallized thermoplastic film layer comprises a thermoplastic selected from the group consisting of polyolefins, polyamides, polyesters, derivatives thereof, and combinations thereof.

8. The article of claim 1, wherein the metallized thermoplastic film layer further comprises an internal performance modifying additive.

9. The article of claim 1, wherein the laminate article further comprises at least one surface projection sufficient to further facilitate flow of air through the laminate article.

10. The article of claim 1, wherein said continuous filament nonwoven layer comprises spunbond polypropylene filaments, said thermoplastic film layer comprises polyethylene, and said metal coating layer comprises aluminum.

11. The article of claim 1, wherein said thermoplastic film layer comprises a smooth film layer.

12. The article of claim 1, wherein said metal coating layer is applied to a film surface of the thermoplastic film layer as a uniform metal coating on the film surface.

13. A heat-reflective, garment interlining laminate article, the laminate article comprising:
    a continuous filament nonwoven layer including at least one surface projection, creating a bi-planar nonwoven layer effective to facilitate flow of air through the laminate article; and
    a metallized thermoplastic film layer affixed directly to the continuous filament nonwoven layer, wherein said metallized thermoplastic film layer consists of single smooth thermoplastic film layer directly affixed as an extrusion coating to the continuous filament nonwoven layer uniform metal coating layer applied to a film surface of the thermoplastic film layer as affixed to the continuous filament nonwoven layer, and wherein the metallized thermoplastic film layer exhibits a reflectivity of at least about 0.85.

14. The article of claim 13, wherein the continuous filament nonwoven layer comprises filaments selected from the group consisting of polyolefins, polyamides, polyesters, and a combination thereof 15. The article of claim 13, wherein the metallized thermoplastic film layer comprises a thermoplastic selected from the group consisting of polyolefins, polyamides, polyesters, derivatives thereof, and combinations thereof.

* * * * *

UNITED STATES PATENT AND TRADEMARK OFFICE
CERTIFICATE OF CORRECTION

| | | |
|---|---|---|
| PATENT NO. | : 7,452,833 B2 | Page 1 of 1 |
| APPLICATION NO. | : 11/215782 | |
| DATED | : November 18, 2008 | |
| INVENTOR(S) | : Robert Daniel Russell et al. | |

It is certified that error appears in the above-identified patent and that said Letters Patent is hereby corrected as shown below:

In column 8, line 39, in Claim 13, between "layer" and "uniform" insert --and a--.

Signed and Sealed this

Seventeenth Day of February, 2009

JOHN DOLL
*Acting Director of the United States Patent and Trademark Office*